(12) United States Patent
Usuda

(10) Patent No.: US 7,477,235 B2
(45) Date of Patent: Jan. 13, 2009

(54) DISPLAY APPARATUS HAVING A SCROLL FEATURE

(75) Inventor: Hiroshi Usuda, Tokyo (JP)

(73) Assignee: Sony Corporation (JP)

(*) Notice: Subject to any disclaimer, the term of this patent is extended or adjusted under 35 U.S.C. 154(b) by 77 days.

(21) Appl. No.: 11/361,633

(22) Filed: Feb. 24, 2006

(65) Prior Publication Data

US 2006/0209094 A1   Sep. 21, 2006

(30) Foreign Application Priority Data

Feb. 25, 2005   (JP)   ............ P2005-050948

(51) Int. Cl.
*G09G 5/00* (2006.01)
*G09G 5/08* (2006.01)
*G09F 3/02* (2006.01)

(52) U.S. Cl. .......... 345/156; 345/157; 345/158; 345/159; 345/160; 345/161; 345/162; 345/163; 345/164; 345/165; 345/166; 345/167; 345/168; 345/169; 345/170; 345/171; 345/172; 345/173

(58) Field of Classification Search ......... 345/156–173; 711/147
See application file for complete search history.

(56) References Cited

U.S. PATENT DOCUMENTS

| | | | |
|---|---|---|---|
| 5,829,041 A * | 10/1998 | Okamoto et al. | 711/147 |
| 6,798,429 B2 * | 9/2004 | Bradski | 345/156 |
| 7,088,344 B2 * | 8/2006 | Maezawa et al. | 345/173 |
| 7,180,500 B2 * | 2/2007 | Marvit et al. | 345/156 |

FOREIGN PATENT DOCUMENTS

JP   2002-007027 A   1/2002

* cited by examiner

*Primary Examiner*—Jin-Cheng Wang
(74) *Attorney, Agent, or Firm*—Lerner, David, Littenberg, Krumholz & Mentlik, LLP

(57) ABSTRACT

A display apparatus includes a display memory for storing an image of a first area forming a portion of an entire image; a display section including a display screen having a display area usable for displaying at least a partial image of the first area; a case for exposing the display screen; a scroll unit operable to move a display screen area appearing on the display screen over the image in accordance with a movement of the case; and a controller operable to provide a virtual memory area for storing an image of a second area having a size greater than the size of the first area in the image when the scroll unit moves the display screen area beyond the first area.

15 Claims, 9 Drawing Sheets

| IM | ID | DEVICE NAME | IMAGE FILE NAME | IMAGE FILE SIZE [byte] |
|---|---|---|---|---|
| V11 | 1001 | 80 | PICT1 | 10M |
| V12 | 1002 | 91 | PICT1 | 20M |
| V13 | 1003 | 92 | PICT1 | 15M |
| V14 | 1004 | 95 | PICT1 | 30M |
| V21 | 1005 | 80 | PICT1 | 20M |
| V22 | 1006 | 97 | PICT1 | 5M |
| V31 | 1007 | 80 | PICT1 | 17M |
| V32 | 1008 | 94 | PICT1 | 10M |
| V41 | 1009 | 80 | PICT1 | 40M |
| V42 | 1010 | 81 | PICT1 | 20M |
| V43 | 1011 | 81 | PICT1 | 50M |
| V44 | 1012 | 96 | PICT1 | 20M |

FIG. 8

| IM | ID | DEVICE NAME | IMAGE FILE NAME | IMAGE FILE SIZE [byte] |
|---|---|---|---|---|
| V11 | 1001 | 80 | PICT1 | 10M |
| V12 | 1002 | 91 | PICT1 | 20M |
| V13 | 1003 | 92 | PICT1 | 15M |
| V14 | 1004 | 95 | PICT1 | 30M |
| V21 | 1005 | 80 | PICT1 | 20M |
| V22 | 1006 | 97 | PICT1 | 5M |
| V31 | 1007 | 80 | PICT1 | 17M |
| V32 | 1008 | 94 | PICT1 | 10M |
| V41 | 1009 | 80 | PICT1 | 40M |
| V42 | 1010 | 81 | PICT1 | 20M |
| V43 | 1011 | 81 | PICT1 | 50M |
| V44 | 1012 | 96 | PICT1 | 20M |

DISPLAY APPARATUS HAVING A SCROLL FEATURE

CROSS-REFERENCE TO RELATED APPLICATIONS

The present application claims priority from Japanese Patent Application No. JP 2005-050948 filed on Feb. 25, 2005, the disclosure of which is hereby incorporated by reference herein.

BACKGROUND OF THE INVENTION

The present invention relates to a display apparatus capable of outputting a scroll display. More particularly, the present invention relates to a display apparatus for detecting a movement of a case for accommodating the display apparatus and outputting a scroll display in accordance with the movement.

In general, the amount of information that can be shown on the display screen of a display apparatus mounted on a device such as a portable terminal or a hand phone is small. Thus, the display apparatus is provided with a function referred to as the so-called scroll display function by which, if an entire image cannot be shown on the display screen, only a partial range of the image is shown on the display screen and the display range of the image can then be shifted by operating a button. In general, this scroll display function is implemented in an apparatus such as a personal computer by adoption of a display operation method. Since the size of an operation section of a portable terminal is also determined under strict constraints, however, an operation carried out on a button to implement the scroll display function in such a portable terminal cannot be said to be an operation that can be performed with a high degree of convenience.

For the reason described above, Japanese Patent Laid-open No. 2002-7027 discloses a technology for detecting a movement of a display apparatus in the forward, backward, left or right and scrolling the display of an image as well at the same time to the direction of the movement. In accordance with the technology, it is possible to get rid of the cumbersomeness of the operation to be otherwise carried out to scroll the display of the image and thus implement the scroll display function matching the intuition of a human being.

The technology disclosed in Japanese Patent Laid-open No. 2002-7027 is a technology adopted in a display apparatus as a technology capable of outputting a scroll display of an image if the data of the image has been stored in a display memory employed in the display apparatus. Thus, if the amount of the data of the image is greater than the storage capacity of the display memory, the technology is not capable of implementing the scroll display function for the image.

In order to solve this problem, it is conceivable to increase the storage capacity of the display memory employed in the display apparatus. In general, however, it is difficult to increase the storage capacity of the display memory employed in the display apparatus, once the memory has been incorporated in the apparatus. In particular, in the case of a display apparatus mounted on a device such as a portable terminal or a hand phone, the case for incorporating the display apparatus is small. Thus, it is even more difficult to increase the storage capacity of the display memory employed in such a display apparatus.

In addition, increasing the storage capacity of such as a display memory raises new problems such as a higher cost and rising power consumption.

SUMMARY OF THE INVENTION

Addressing the above problems, the inventors of the present invention have devised a display apparatus capable of displaying an image having a size greater than the storage capacity of a display memory by a simple operation.

In order to solve the problems described above, the present invention provides a display apparatus having a display memory for storing an image of a first area forming a portion of an entire image; a display section including a display screen having a display area usable for displaying at least a partial image of the first area; a case for exposing the display screen; scroll means for moving a display screen area appearing on the display screen over the entire image in accordance with a movement of the case; and control means for providing a virtual memory area for storing an image of a second area having a size greater than the size of the first area in the entire image when the scroll means moves the display screen area beyond the first area.

In this case, the image is a concept of showing a display object that can be recognized by an eye. The substance of the image can be video data, a pattern or text.

The display apparatus may further include detection means for detecting the direction of movement of the case and, based on the detected direction of movement, the control means identifies a partial area of the second area and limits the virtual memory area to be set to the partial area.

The control means may manage the second area by dividing the second area into a plurality of partial areas and may set the virtual memory area allocated to the partial areas in a memory device selected from a plurality of memory devices including external memory devices.

The control means may set the virtual memory area in a memory device selected from a plurality of memory devices based on the amount of image data of the partial areas and the storage capacity and/or access speed of each of the memory devices.

The display apparatus may further include communication means connectable to a plurality of networks. The control means may manage the second area by dividing the second area into a plurality of partial areas and may set the virtual memory area allocated to the partial areas in a memory device selected from a plurality of memory devices connected to the networks.

The memory device setting the virtual memory area may be selected based on the amount of image data of the partial areas and the communication speed and/or band of each of the networks to which the plurality of memory devices are connected.

The display apparatus may further include a buffer for storing a portion of the image. The control means may transfer the image of a third area including a particular partial area included in the second area as a partial area approached by the display screen area or closest to the display screen area from a particular virtual memory area allocated to the particular partial area to the buffer while the display screen area still exists in the first area; and when the scroll means has moved the display screen area to a location outside the first area, an area to be accessed for displaying the display screen area is switched from the display memory to the buffer.

Operations of the present invention are described as follows.

The scroll means moves the display screen area appearing on the display screen over the entire image in the case. During the operation to move the display screen area, the image of the first area is read out from the display memory as a portion of the entire image to be displayed on the display screen as long as the display screen area is moving within the first area. Then, when the scroll means has moved the display screen area to a location outside the first area, the control means sets a virtual memory area used for storing the image of a second area with a size exceeding the size of the first area in the entire image.

The virtual memory area can be set in a memory employed in the display apparatus as a memory other than the display memory or in an external memory device. The virtual memory area is allocated to image data included in the entire image as image data that cannot be stored in the display memory.

That is to say, when the scroll means moves the display screen area to a location outside the first area, image data is read out from the virtual memory area to be displayed on the display screen.

In accordance with the present invention, it is possible to display an image having a size greater than the storage capacity of a display memory by a simple operation.

BRIEF DESCRIPTION OF THE DRAWINGS

FIG. 8 is a diagram showing a table included in a control section as a table of management states of the virtual memory area set in a plurality of memory devices shown in FIG. 7.

DETAILED DESCRIPTION

First Embodiment

An embodiment of the present invention is explained by referring to diagrams as follows.

Figure 1:
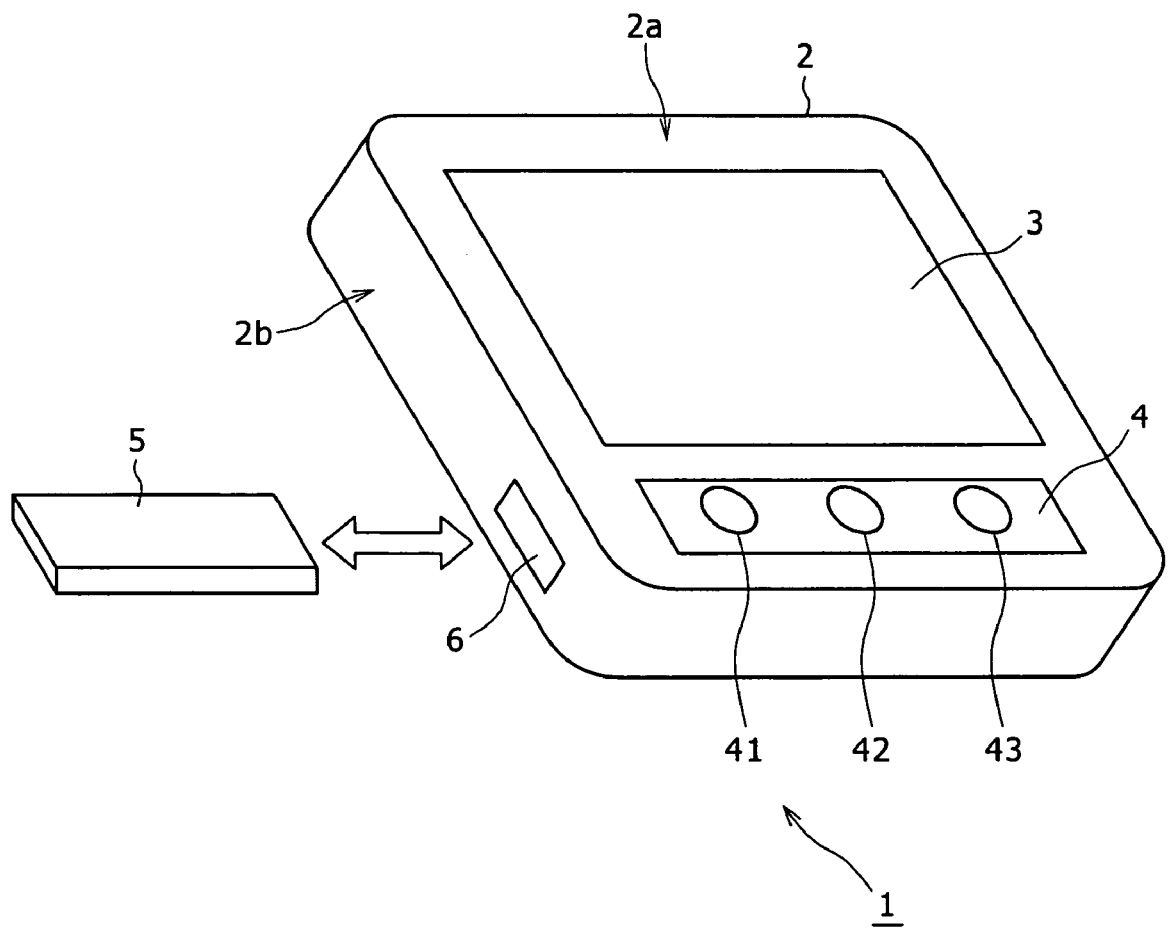
FIG. 1 is a diagram showing a perspective view of the external appearance of a display apparatus according to an embodiment of the present invention schematically.

FIG. 1 is a diagram showing a perspective view of the external appearance of a display apparatus 1 according to the embodiment of the present invention schematically.

As shown in FIG. 1, the display apparatus 1 has a case 2 with a size allowing the case to be held for example by a hand. A display section 3 and an operation section 4 are provided on the front face 2a of the case 2. On a side face 2b of the case 2, a mounting section 6 is provided. The mounting section 6 allows a disk-shaped storage medium 5 to be mounted on the mounting section 6 and dismounted from the mounting section 6 with a high degree of freedom. The display section 3 is typically a color LCD (Liquid Crystal Device). The operation section 4 is provided with operations buttons 41 to 43 to be operated by the user to carry out operations on the display apparatus 1.

[Configuration of the Display Apparatus 1]

Figure 2:
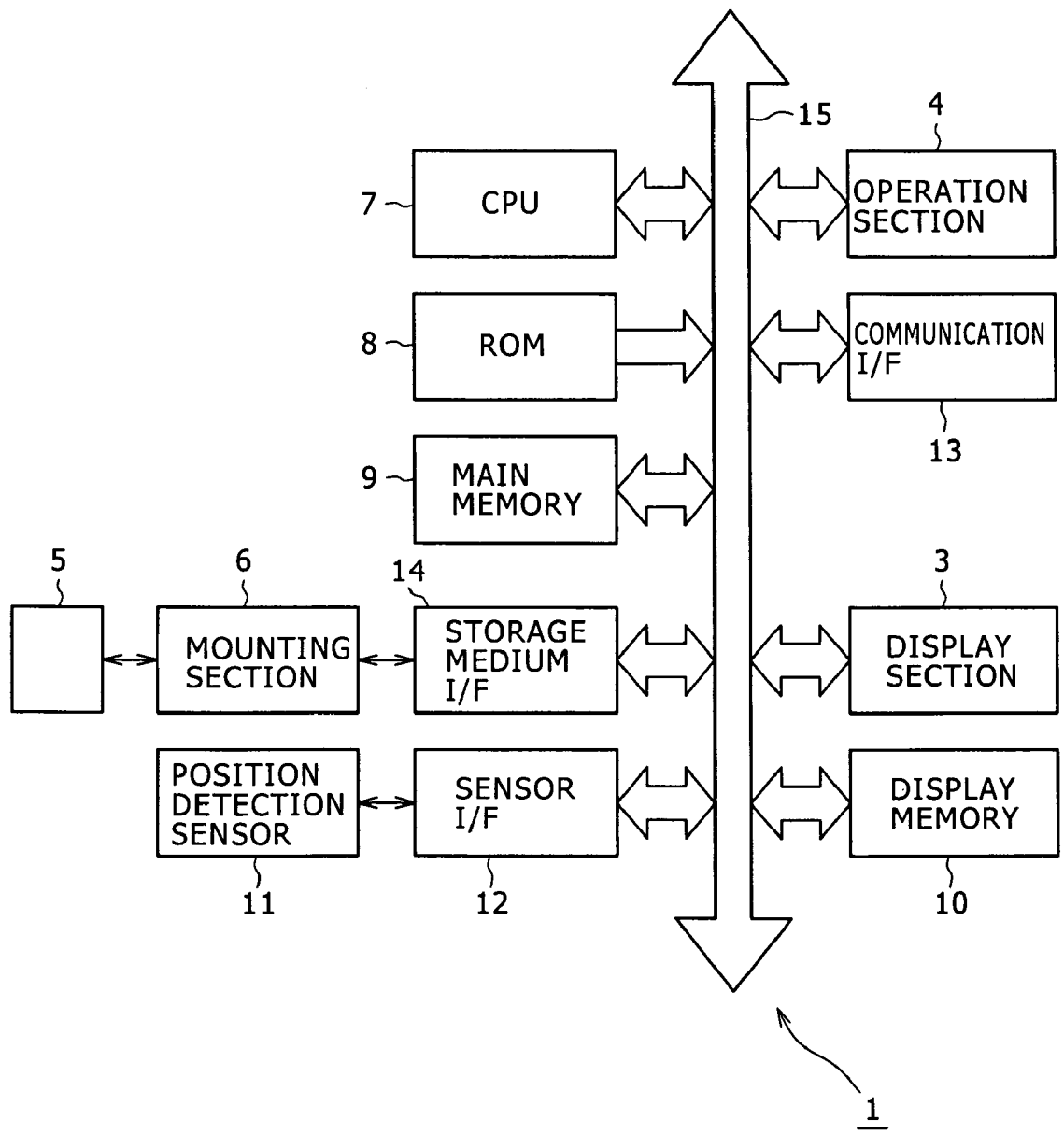
FIG. 2 is a block diagram showing the hardware configuration of the display apparatus according to the embodiment.

FIG. 2 is a block diagram showing the hardware configuration of the display apparatus 1.

As shown in FIG. 2, the display apparatus 1 includes the display section 3 mentioned above, the operation section 4 cited above, a CPU serving as a control section 7, a ROM 8, a main memory 9, a display memory 10, a storage medium interface (storage medium I/F) 14, a sensor interface (sensor I/F) 12 and a communication interface (communication I/F) 13, which are connected to each other by a system bus 15.

The control section 7 includes a CPU as the principal component. The control section 7 is a section for controlling the whole display apparatus 1. The ROM 8 is a memory used for storing programs necessary for controlling the display apparatus 1. In addition, the control section 7 also implements a scroll display function to be described later.

The storage medium interface 14 is connected to the mounting section 6 so that the storage medium interface 14 is capable of communicating data with the storage medium 5 mounted on the mounting section 6. If necessary, a virtual memory area to be described later is set on the storage medium 5.

The sensor interface 12 is connected to a position detection sensor 11. The position detection sensor 11 is a sensor for detecting a vector quantity representing the distance of a movement of the case 2.

An acceleration sensor can be employed as a typical position detection sensor 11. The acceleration sensor is a device for detecting accelerations in two axial or three axial directions as accelerations of the display apparatus 1 typically held by a hand of the user and moved in a space.

Let us assume for example that the acceleration sensor is a sensor for detecting accelerations in two axial directions. In this case, the acceleration sensor detects the vertical-direction and horizontal-direction components of an acceleration applied to the display apparatus 1 and integrates each of the components with respect to the time axis in order to compute respectively vertical-direction and horizontal-direction components of the velocity and displacement for the acceleration. In addition, an acceleration sensor, an angular-velocity sensor and an earth magnetic sensor can be combined to form the position detection sensor 11.

The movement distance obtained as a detection result produced by the position detection sensor 11 is used in the scroll display function described later as a function to display an image.

The ROM 8 is used for storing a basic program required for operating the display apparatus 1 and a program for executing the function to display an image.

The main memory 9 is a RAM having a large storage capacity. A program stored in the ROM 8 is loaded into the main memory 9 to be executed by the CPU employed in the control section 7.

The main memory 9 is also used for storing image data, which is also properly referred to hereafter as an image. In addition, a virtual memory area to be described later is set in the main memory 9 when necessary.

The display memory 10 is typically a RAM used for storing data of an image to be displayed. The image data stored in the display memory 10 as data of an image to be displayed on the display screen of the display section 3 is data transferred from the main memory 9. In the case of an image having a very large size, however, the data of the image cannot be all stored in the display memory 10. In this case, only a portion of the image data is transferred from the main memory 9 to the display memory 10.

It is to be noted that, in some cases, the display memory 10 is a partial area of the main memory 9 or a memory integrated in with the display section 3.

As described above, the operation section 4 is provided with the operations buttons 41 to 43 to be operated by the user to carry out operations on the display apparatus 1. For example, the user operates one of the operations buttons 41 to 43 in order to select an image to be displayed from those stored in the main memory 9. In addition, the user is also capable of operating one of the operations buttons 41 to 43 in order to activate or deactivate the scroll display function.

The communication interface 13 is a communication processing section for connecting the display apparatus 1 to an external network. For example, the communication interface 13 connects the display apparatus 1 to the Ethernet in order to exchange data with an external memory device through the Ethernet.

Scroll Display Function

The display apparatus 1 has the scroll display function mentioned earlier. The scroll display function can be implemented by hardware, software or both. The scroll display function of the display apparatus 1 is explained by referring to FIG. 3 as follows.

Figure 3:
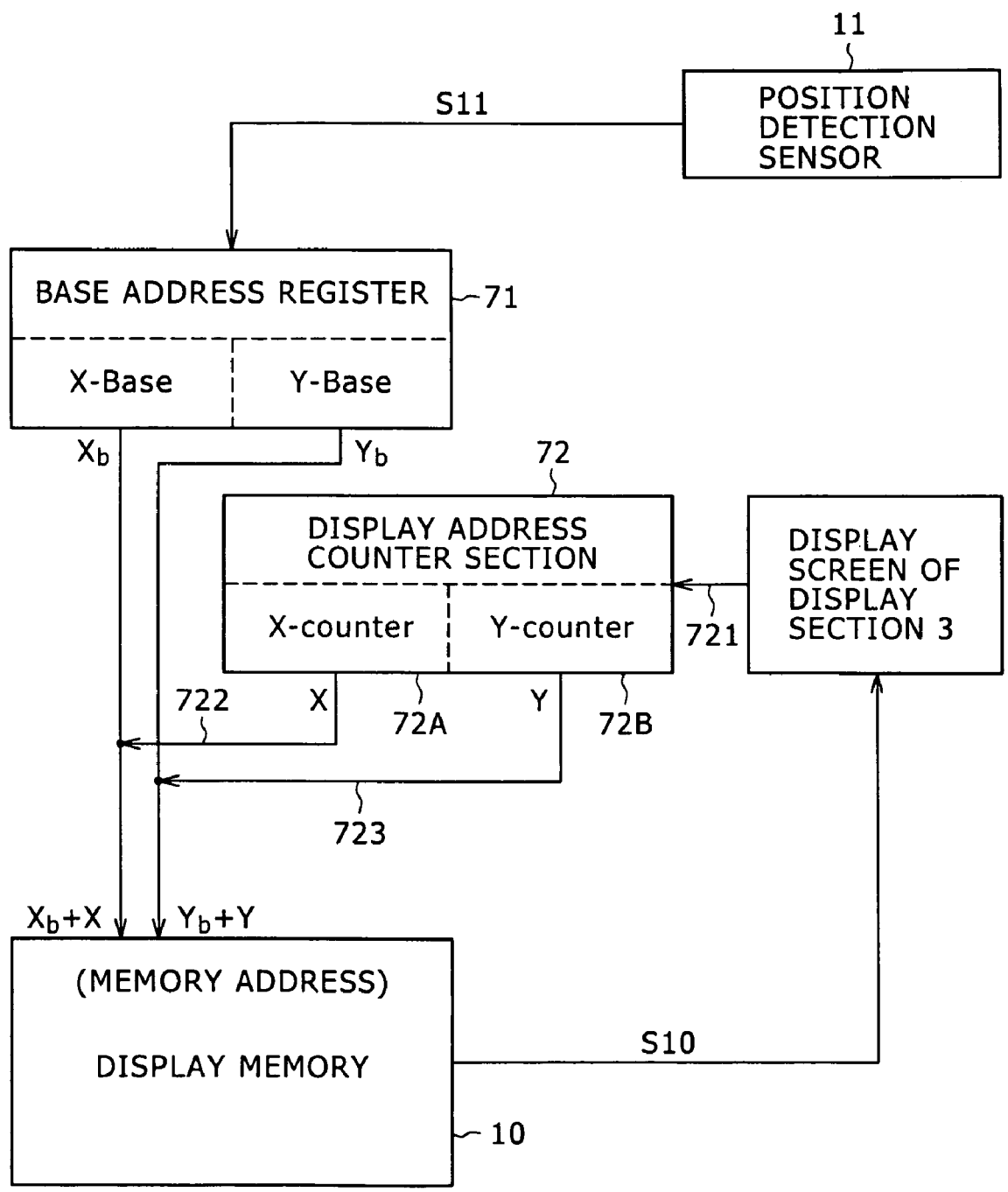
FIG. 3 is a block diagram showing the configuration of a circuit for controlling a movement of an image and displaying an image.

FIG. 3 is a block diagram showing the configuration of a circuit for controlling a movement of an image and displaying an image.

The configuration of the circuit includes the display section 3, the position detection sensor 11, a base address register 71, a display address counter section 72 and the display memory 10. The base address register 71 and the display address counter section 72 are each a component included in the control section 7.

The display address counter section 72 includes an X counter 72A and a Y counter 72B. The X counter 72A is a counter for generating X-coordinate data (X) denoted by reference numeral 722 on the basis of address data 721 showing a scanning point (x, y) scanning the whole area of the display screen of the display section 3. By the same token, the Y counter 72B is a counter for generating Y-coordinate data (Y) denoted by reference numeral 723 on the basis of the address data 721 showing a scanning point (x, y) scanning the whole area of the display screen of the display section 3.

On the other hand, the base address register 71 is a register for holding X base data $X_b$ and Y base data $Y_b$ as a base address of a reference point of an image stored in the display memory 10 and displayed on the display screen of the display section 3.

In the display memory 10, an address area in the range ($X_b$, $Y_b$) to ($X_b+X$, $Y_b+Y$) is read out from the display section 3 and displayed on the display screen.

At a point of time data of an image is transferred to the display memory 10, the X base data $X_b$ and the Y base data $Y_b$, which are output by the base address register 71 as the coordinates of an origin of a display, coincide with the addresses of an origin of a storage area in the display memory 10. The origin of a storage area in the display memory 10 is a point set in advance to serve as a reference.

The origin of a storage area in the display memory 10 is set typically at a point on the left lower corner of a display screen area of the display section 3 for a case in which the position of the display screen area is adjusted to coincide with the center of the area of the display memory 10.

In this state, when the display apparatus 1 is moved by a hand holding the display apparatus 1, the value S11 of a movement distance detected by the position detection sensor 11 is supplied to the base address register 71 as the X base data $X_b$ and the Y base data $Y_b$ to be used for updating the coordinates of the origin. The updated coordinates of the origin are used in the display memory 10 as the coordinates of a reference point of an area to be cut out from an image to be displayed on the display screen of the display section 3.

Thus, image data S10 read out from the display memory 10 changes in accordance with the value S11 of a movement distance detected by the position detection sensor 11.

Figure 4:
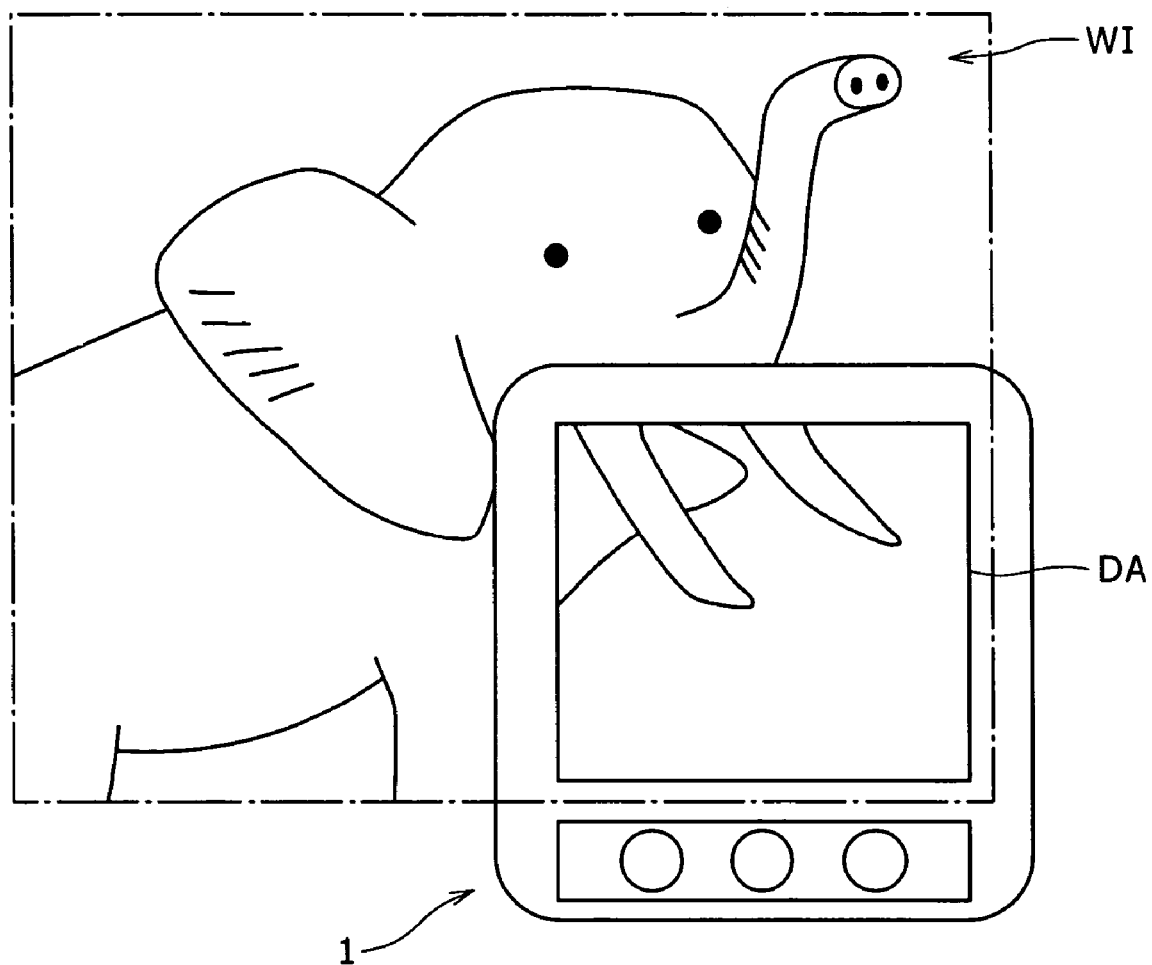
FIG. 4 is a diagram showing a model of a relation between the area of an entire image and a display screen area.

With regard to the scroll display function, a relation between an entire image and a display screen area is described by referring to FIG. 4.

In this case, the entire image is like an image stored in the main memory 9 and read out by an operation carried out by the user. However, the entire image is used from a standpoint of distinguishing the entire image from a displayed image, which is defined as an image displayed on the display screen of the display section 3. Thus, by execution of the scroll display function, a portion of the entire image is displayed as a display image on the display screen of the display section 3.

FIG. 4 is a diagram showing a model of a relation between the area of an entire image and the display screen area. In the diagram, reference notation WI denotes the area of an entire image and reference notation DA denotes the display screen area of the display section 3. The area of an entire image is also referred to hereafter as an entire image area WI.

In the case shown in FIG. 4, when the display apparatus 1 is moved in the left direction, the position detection sensor 11 detects the movement and the entire image area WI is scrolled in the right direction over the display screen area DA. When the display apparatus 1 is moved in the right direction, on the other hand, the position detection sensor 11 detects the movement and the entire image area WI is scrolled in the left direction over the display screen area DA. By the same token, when the display apparatus 1 is moved in the downward direction, the position detection sensor 11 detects the movement and the entire image area WI is scrolled in the upward direction over the display screen area DA. When the display apparatus 1 is moved in the upward direction, on the other hand, the position detection sensor 11 detects the movement and the entire image area WI is scrolled in the downward direction over the display screen area DA.

As is obvious from the above description, by moving the display apparatus 1 in the left, right, upward and downward directions, the user is capable of viewing the entire image area WI.

It is to be noted that, in order to make the explanation simple, instead of explaining that the entire image area WI serving as a background image moves over the fixed display screen area DA in a scroll operation, the following description is mainly given by assuming that the display screen area DA moves over the fixed entire image area WI. It is needless to say, however, that motion of the entire image area WI over the fixed display screen area DA is essentially the same phenomenon as the motion of the display screen area DA over the fixed entire image area WI.

Virtual Memory Area

In addition, in the display apparatus 1 according to the embodiment, a virtual memory area is provided so as to allow an entire image with a size exceeding the storage capacity of the display memory 10 to be displayed by execution of the scroll display function. The virtual memory area is explained as follows.

Figure 5:
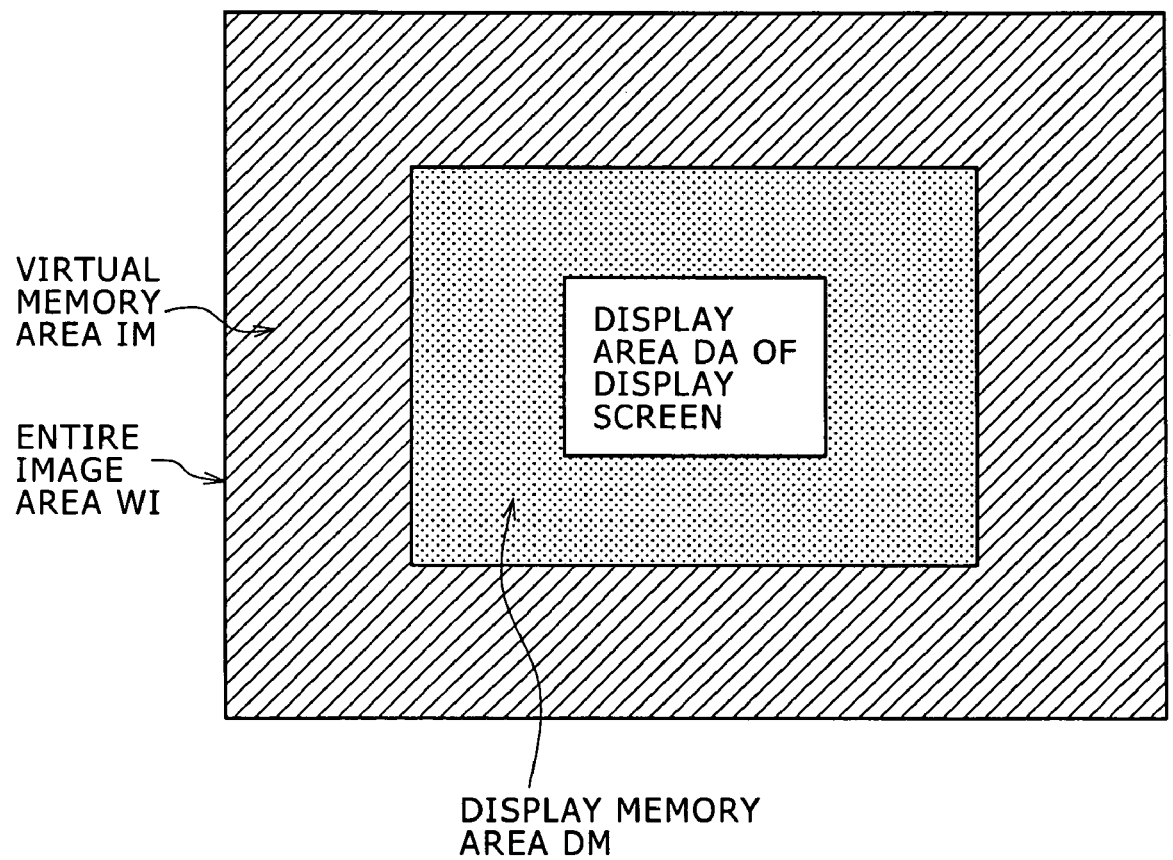
FIG. 5 is a diagram showing a relation between the display area of a display screen and memory areas.

FIG. 5 is a diagram showing a relation between the display area of the display screen and memory areas. In the figure, reference notation DM denotes the display memory area, which is defined as the area of the display memory 10, and reference notation IM denotes the virtual memory area.

It is to be noted that the display memory area DM corresponds to a first area provided by the present invention. On the other hand, an outer-side area included in the entire image as an area outside the display memory area DM corresponds to a second memory provided by the present invention.

As described earlier, the origin serving as the reference of a screen display on the display memory area DM is set so as to position the display screen area DA at the center of the display memory area DM.

Data of an image having a very large size cannot all be transferred from the main memory 9 to the display memory 10. Thus, only a portion of the data or a portion of the entire image is transferred from the main memory 9 to the display memory 10. The portion transferred from the main memory 9 to the display memory 10 is a portion that can be accommodated in the display memory 10. In this case, the entire image area WI is greater than the display memory area DM as shown in FIG. 5.

The virtual memory area IM is set for displaying a portion included in the entire image area WI as a portion outside the display memory area DM. It is desirable to set the virtual memory area IM at a location included in the main memory 9, which can be accessed at a high speed. However, the location of the virtual memory area IM is not limited to such a location. For example, the virtual memory area IM can also be set in the storage medium 5. As another alternative, the virtual memory area IM can also be set in an external memory device that can be accessed through the communication interface 13.

Processing to set the virtual memory area IM is explained as follows.

By execution of the scroll display function, the display screen area DA is moved in the upward, downward, left or right direction from a position shown in FIG. 5. If the range of the movement of the display screen area DA is within the range of the display memory area DM, a scroll display process is carried out in accordance with the operation explained before by referring to FIG. 3.

Then, as the execution of the scroll display function in the same direction is continued, the display screen area DA moves beyond the range of the display memory area DM. That is to say, on the basis of the movement distance found from the output of the position detection sensor 11, the control section 7 determines that the display screen area DA has moved to a location outside the range of the display memory area DM. At that time, the virtual memory area IM is allocated in the main memory 9 and used for storing the image data, that is, the data of the entire image. An operation to read out the image from the virtual memory area IM to the display section 3 is the same as the operation explained earlier by referring to FIG. 3.

As described above, for an image having a size greater than the size of the display memory area DM, an virtual memory area IM is set if necessary. Thus, by execution of the scroll display function, the user is capable of viewing the entire image.

It is to be noted that, while the display screen area DA still exists in the range of the display memory area DM, the range reserved as a range in which the virtual memory area IM to be set may be limited to a smaller storage area in the main memory 9 on the basis of the movement direction found from the output of the position detection sensor 11 as the direction of the movement of the display screen area DA. In this way, the area of the main memory 9 can be utilized with a higher degree of efficiency.

For example, if the display screen area DA is moving in range of the display memory area DM in the left direction, a virtual memory area IM may be set in an area included in the main memory 9 as an area corresponding to only on the left side adjacent to the display memory area DM.

Second Embodiment

Next, a second embodiment provided by the present invention as an embodiment for implementing a display apparatus provided by the present invention is explained.

In the case of the display apparatus according to the first embodiment described above, the virtual memory area IM is all set in the main memory 9. In the case of the second embodiment, however, the virtual memory area IM can also be set in the storage medium 5 or an external memory device, which can be accessed through the communication interface 13.

Thus, this embodiment is effective for a case in which the amount of data of an image is extremely large so that the storage capacity of the main memory 9 is not large enough for storing all the data of the image.

In addition, if the amount of data of an image is extremely large, the image is divided into a plurality of partial images, and a virtual memory area IM may be allocated in a plurality of memory devices including the storage medium 5 and the main memory 9 as a memory used for storing the partial images.

Figure 6:
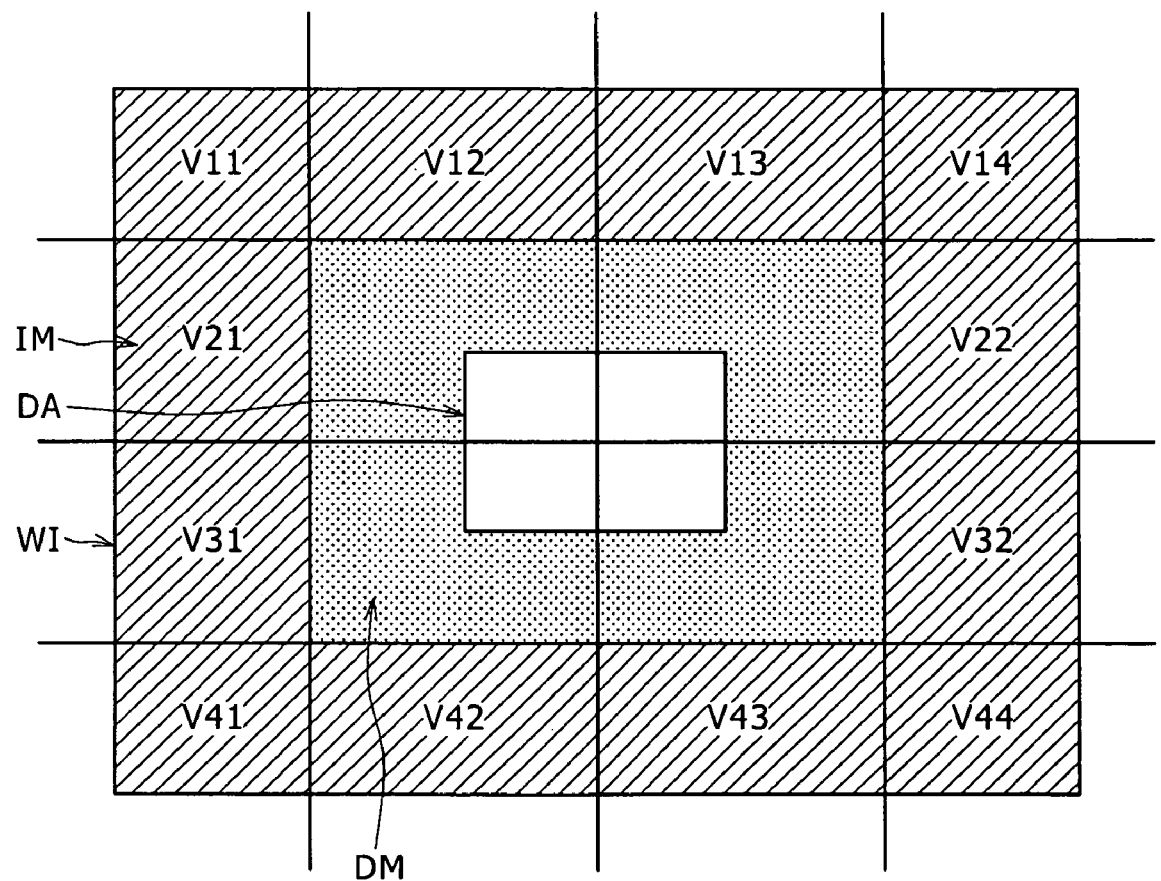
FIG. 6 is a diagram showing a state in which an entire image is divided into a plurality of partial images in accordance with a second embodiment of the present invention.

FIG. 6 is a diagram showing a state in which an entire image is divided into a plurality of partial images. In this diagram, a typical virtual memory area IM allocated in the entire image area WI to a portion included in the entire image as a portion outside the display screen area DA includes a plurality of partial areas V11 to V44. It is to be noted that the number of partial areas is not limited to the number in the state shown in the figure. That is to say, the number of partial areas can be changed.

In the display apparatus according to this embodiment, each memory device is selected from a plurality of memory devices so that the memory device is optimally allocated to each of the partial areas.

For example, the amount of data of each partial area varies from image to image. In this case, the setting position of the virtual memory area IM consisting of the partial areas may be changed in dependence on the amount of image data. That is to say, a rank is assigned to each of the memory devices in advance from the data-amount point of view, that is, from the standpoint of the variable storage capacity of each of the memory devices. Then, in dependence on the amount of data of each partial area, the virtual memory area IM is set in a series of memory devices selected in a decreasing-rank order starting with the memory device having the high rank. By selecting memory devices in this way, the load of swapping data among the memory devices can be reduced.

In addition, a rank may also be assigned to each of the memory devices in advance from the access-speed point of view, that is, from the standpoint of the variable access speed of each of the memory devices. Also in this case, the virtual memory area IM is set in a series of memory devices selected in a decreasing-rank order starting with the memory device having the high rank in dependence on the amount of data of each partial area. By selecting memory devices in this way, it is possible to improve a display response characteristic showing a response to a transition of the display screen area DA from the display memory area DM to the virtual memory area IM.

A rank may also be assigned to each of the memory devices in advance on the basis of a combination of the variable storage capacity and variable access speed of each of the memory devices.

On the other hand, the virtual memory area IM consisting of the partial areas may be set in a plurality of memory devices connected to the display apparatus by a network. Also in this case, in the same way, the setting location of the virtual memory area IM consisting of the partial areas is changed on the basis of the amount of data in each of the partial areas. For example, a rank is assigned to each of the memory devices in advance from the standpoint of the communication speed and/or band of a network, through which accesses are made to the memory device, and a virtual memory area IM is set in memory devices selected sequentially in a decreasing-rank order starting with a memory device with a highest rank in accordance with the amount of data in each of the partial areas. It is thus possible to improve the display responsiveness, which is exhibited when the display screen area DA transits from the display memory area DM to the virtual memory area IM.

Figure 7:
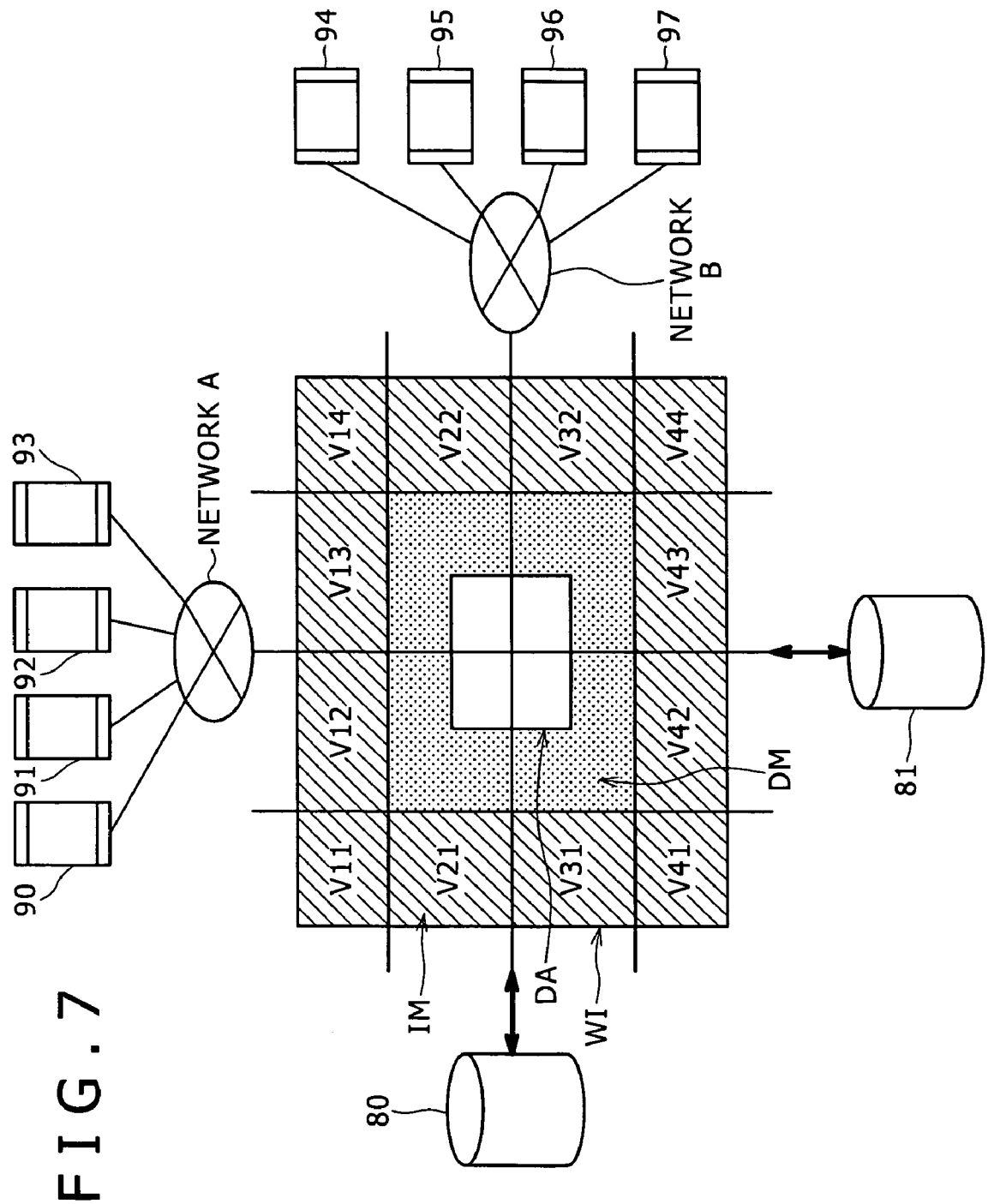
FIG. 7 is a diagram showing a model of a case in which a virtual memory area including a plurality of partial areas is set in a plurality of memory devices located at distributed locations.

FIG. 7 is a diagram showing a model of a case in which the virtual memory area IM consisting of a plurality of partial areas is set in memory devices installed at distributed locations. The memory devices include external memory devices 80 and 81, memory devices 90 to 93 connected to a network A as well as memory devices 94 to 97 connected to a network B. In this way, it is possible to set the virtual memory area IM for executing the scroll display function in memory devices accessible to the display apparatus 1 without regard to whether accesses to any of the memory devices are made by the display apparatus 1 through radio or wire transmission.

FIG. 8 is a diagram showing a table of management states of the virtual memory area IM set in a plurality of memory devices as shown in FIG. 7. A device name on a column of the table shown in FIG. 8 represents reference numerals each denoting a memory device as shown in FIG. 7. As shown in the table, the control section 7 determines a memory device, in which a virtual memory area IM consisting of any particular one of the partial areas V11 to V44 is set, on the basis of the size of an image file displayed on the particular partial area.

As described above, in accordance with the display apparatus 1 according to this embodiment, in the case of an image with a size exceeding the size of the display memory area DM, the virtual memory area IM is set in external memory devices if necessary in order to allow the user to view the whole of the image without modifying and/or increasing the display memory 10 and/or the main memory 9, which have already been built in the display apparatus 1.

Third Embodiment

Next, a third embodiment of the present invention is explained.

In the display apparatus 1 according to the first and second embodiments described above, partial areas included in the entire image area WI as portions existing outside the display memory area DM are set in the virtual memory area IM. However, the display responsiveness, which is exhibited by an external apparatus including a virtual memory area IM when the display screen area DA transits from the display memory area DM to the virtual memory area IM, may be slow in some cases.

For example, in the case of the example shown in FIGS. 7 and 8, the image data of the partial area V12 exists in a virtual memory area set in the memory device 91 connected to a network. By the same token, the image data of the partial area V13 exists in a virtual memory area set in the memory device 92 connected to the network. With the display screen area DA existing in the display memory area DM, image data is read out from the display memory area DM and displayed at a high speed. As soon as the display screen area DA transits from the display memory area DM to the partial areas V12 and V13, however, image data must be read out from the virtual memory areas through the network A. At that time, the operation to read out the image data is slow due to a communication delay and other causes.

In order to solve the problem seen from this point of view, the present invention provides a third embodiment devised by inventors of the present invention as an embodiment for improving the display response characteristic even for an event in which the display screen area DA transits from the display memory area DM to the virtual memory area IM.

To put it concretely, in order to improve the display response characteristic even for such an event, the display apparatus according to this embodiment is provided with a buffer memory serving as an interface between the display memory and the virtual memory. The buffer memory is used for storing image data of a portion of the entire image area WI. Image data of the portion corresponding to a particular virtual memory area selected dynamically in dependence on a location included in the display memory area DM as the location of the display screen area DA is transferred in advance from the particular virtual memory area to the buffer memory. Thus, it is possible to improve the display response characteristic even for an event in which the display screen area DA transits from the display memory area DM to the particular virtual memory area. Since it is not necessary to transfer all the image data of the entire image area WI from all virtual memory areas to the buffer memory, the efficiency to utilize the buffer memory provided in the display apparatus can be improved.

It is to be noted that, in the configuration of the display apparatus 1 shown in FIG. 2, the buffer memory can be provided as an area inside the main memory 9 or as an independent buffer connected to the system bus 15.

The operation of the display apparatus 1 according to this embodiment is explained by referring to FIG. 9 as follows.

Figure 9:
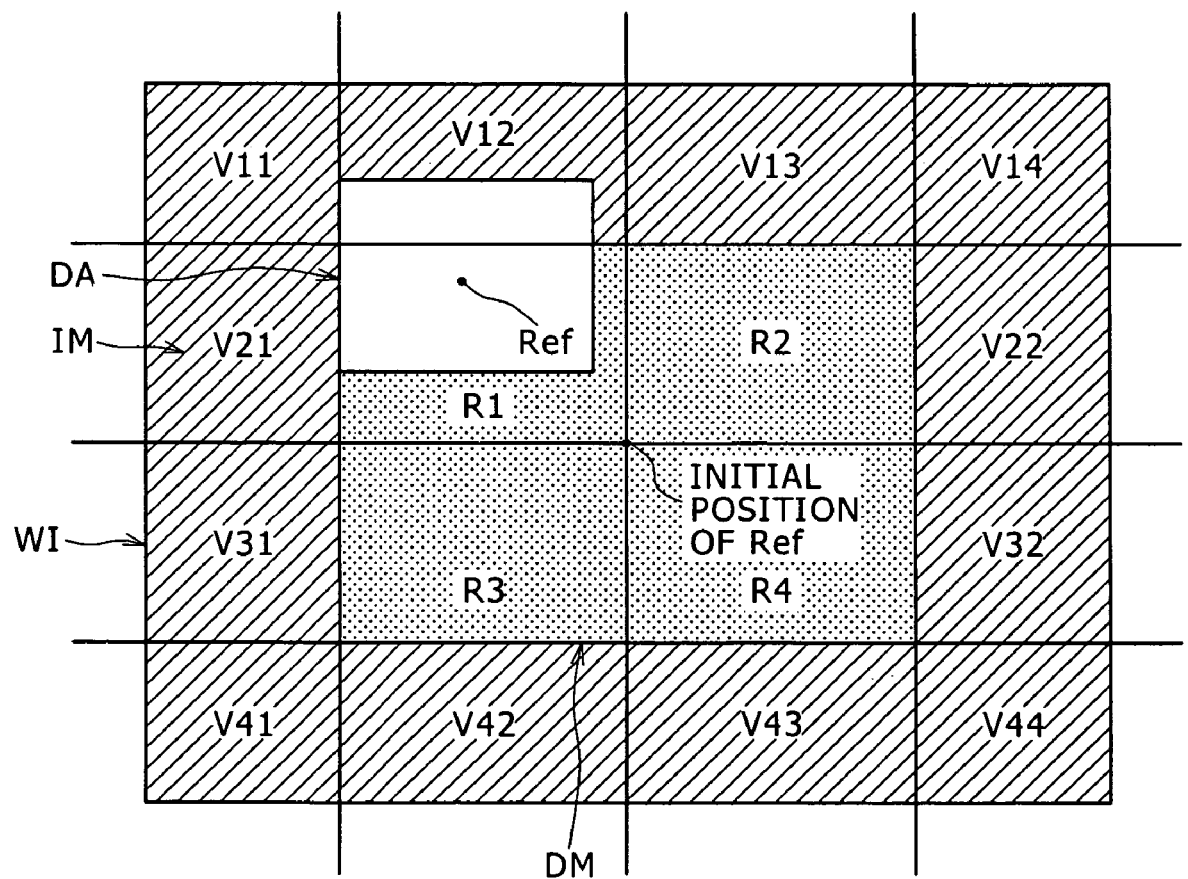
FIG. 9 is a diagram showing a state in which an entire image is divided into a plurality of partial images in accordance with a third embodiment of the present invention.

Much like FIG. 6, FIG. 9 is a diagram showing a state in which an entire image is divided into a plurality of partial images. The diagram of FIG. 9 is different from the diagram of FIG. 6 in that, in the case of the diagram of FIG. 9, the display memory area DM is managed by dividing the display memory area DM into a plurality of display partial areas R1 to R4.

At a point of time an image is initially displayed on the display screen area DA, that is, in an initial state, the origin serving as the reference of the screen display on the display memory area DM is set at a position making the center of the display screen area DA coincide with the center of the display memory area DM. As the scroll display function is executed, the display screen area DA moves from this initial state over the display memory area DM in an upward, downward, left or right direction.

As shown in FIG. 9, a point at the center of the display screen area DA is referred to as the reference point Ref of the display screen area DA. The reference point Ref may move to any one of the display partial areas R1 to R4. The virtual memory area IM from which image data is to be transferred to the buffer memory is determined in accordance with a display partial area to which the reference point Ref has moved. It is to be noted that, the image data is transferred from a virtual memory area IM to the buffer area in advance while the entire display screen area DA still exists in the display memory area DM.

For example, the scroll display function is executed to move the reference point Ref from the initial state to the display partial area R1 in the display memory area DM as described above. In this case, image data of the display partial area R1 of the display memory area DM and image data in the partial areas V11, V12 and V21 of the virtual memory area IM are transferred in advance to the buffer memory. Typically, the partial areas V11, V12 and V21 of the virtual memory area IM have been set in memory devices. That is to say, pieces of image data are transferred from the partial areas R1, V11, V12 and V21 to the buffer memory as parts of the entire image.

Then, as the display screen area DA goes beyond the display memory area DM as a result of execution of the scroll display function by the user, the access object for a screen display is switched from the display memory 10 to the buffer memory. At a point of time the access object for a screen display is switched from the display memory 10 to the buffer memory, necessary image data has been stored in the buffer memory. Thus, it is not necessary to make an access to a virtual memory area set in an external memory device. As a result, the response characteristic of the screen display is improved.

By the same token, if the scroll display function is executed to move the reference point Ref from the initial state to the display partial area R2, R3 or R4 in the display memory area DM, the following pieces of image data are transferred in advance from a virtual memory area to the buffer memory for cases (1) to (3) as follows:

Case (1): The reference point Ref is moved from the initial state to the display partial area R2.

In this case, pieces of image data are transferred from the partial areas R2, V13, V14 and V22.

Case (2): The reference point Ref is moved from the initial state to the display partial area R3.

In this case, pieces of image data are transferred from the partial areas R3, V31, V41 and V42.

Case (3): The reference point Ref is moved from the initial state to the display partial area R4.

In this case, pieces of image data are transferred from the partial areas R4, V32, V43 and V44.

It is to be noted that a group of partial areas, from which pieces of image data are transferred to the buffer memory, corresponds to a third area of the present invention. In addition, the number of partial areas shown in FIG. 9 is typical. In other words, it is needless to say that the number of partial areas can be properly changed.

Also in the display apparatus 1 according to this embodiment, any one of the partial memories V11 to V44 included in the virtual memory area IM as a portion that cannot be accommodated in the display memory area DM is optimally set in one selected among memory devices existing at distributed locations.

For example, as explained in the description of the second embodiment, the setting position of the virtual memory area IM consisting of the partial areas may be changed in accordance with the amount of data included in each of the partial areas. That is to say, a rank is assigned to each of a plurality of memory devices in advance in accordance with an assignment method seen from the standpoints of the storage capacity (or the amount of data) and/or access speed of each of the memory devices. Then, the virtual memory area IM is set in memory devices selected sequentially in a decreasing-rank order starting with a memory device with a highest rank in accordance with the amount of data in each of the partial areas. It is thus possible to improve the efficiency of the operation to transfer data from a virtual memory area to the buffer memory.

If the virtual memory area IM consisting of partial areas is set in a plurality of memory devices connected to a network, on the other hand, a rank is assigned to each of the memory devices in advance from the standpoints of the communication speed and/or band of a network, through which accesses are made to the memory device, and a virtual memory area IM is set in memory devices selected sequentially in a decreasing-rank order starting with a memory device with a highest rank in accordance with the amount of data in each of the partial areas. It is thus possible to improve the efficiency of operations to transfer data from the memory devices to the buffer memory.

Elements of the first to third embodiments described above can be combined properly to create a new embodiment. In addition, embodiments of the present invention are not limited to the first to third embodiments described above. A person skilled in the art is capable of creating a variety of modified versions of the embodiments within a range not deviating from essentials of the present invention.

In addition, it should be understood by those skilled in the art that a variety of modifications, combinations, sub-combinations and alterations may occur in dependence on design requirements and other factors insofar as they are within the scope of the appended claims or the equivalents thereof.

The invention claimed is:

1. A display apparatus, comprising:
    a display memory for storing an image of a first area forming a portion of an entire image;
    a display section including a display screen having a display area usable for displaying at least a partial image of the first area;
    a case for exposing the display screen;
    scroll means for moving a display screen area appearing on the display screen over the entire image in accordance with a movement of the case;
    control means for providing a virtual memory for storing an image of a second area having a size greater than the size of the first area in the entire image when the scroll means moves the display screen area beyond the first area; and
    a table of management states of the virtual memory area in a respective memory device, in which the table of management states includes a listing representative of a plurality of virtual memory areas and an identification, a memory device name, an image file name, and an image file size for each of the virtual memory areas.

2. The display apparatus according to claim 1, further comprising detection means for detecting the direction of movement of the case, wherein, based on a detected direction of movement, the control means identifies a partial area of the second area.

3. The display apparatus according to claim 1, wherein the control means manages the second area by dividing the second area into a plurality of partial areas and sets the virtual memory to a memory device selected from a plurality of memory devices including external memory devices.

4. The display apparatus according to claim 3, wherein the control means sets the virtual memory in the memory device selected from the plurality of memory devices based on the amount of image data of the partial areas and the storage capacity and/or access speed of each of the memory devices.

5. The display apparatus according to claim 1, further comprising communication means connectable to a plurality of networks, wherein the control means manages the second area by dividing the second area into a plurality of partial areas and sets the virtual memory to a memory device selected from a plurality of memory devices connected to the networks.

6. The display apparatus according to claim 5, wherein the memory device is selected based on the amount of image data of the partial areas and the communication speed and/or band of each of the networks to which the plurality of memory devices are connected.

7. The display apparatus according to claim 1, further comprising a buffer for storing a portion of the image, wherein
the control means transfers the image of a third area including a particular partial area included in the second area as a partial area approached by the display screen area or closest to the display screen area from a particular virtual memory area allocated to the particular partial area to the buffer while the display screen area still exists in the first area; and
when the scroll means has moved the display screen area to a location outside the first area, an area to be accessed for displaying the display screen area is switched from the display memory to the buffer.

8. The display apparatus according to claim 7, wherein a plurality of the third areas is set in accordance with the position of the display screen area in the first area and each of the third areas is associated with a virtual memory area set in one memory device selected from a plurality of memory devices including external memory devices.

9. The display apparatus according to claim 8, wherein each of the third areas is associated with a virtual memory area set in a memory device selected from the plurality of memory devices based on the amount of image data of the third area and the storage capacity and/or access speed of each of the memory devices.

10. The display apparatus according to claim 7, further comprising communication means connectable to a plurality of networks, wherein a plurality of the third areas is set in accordance with the position of the display screen area in the first area and each of the third areas is associated with a virtual memory area set in one memory device selected from a plurality of memory devices connected to the networks.

11. The display apparatus according to claim 10, wherein each of the third areas is associated with a virtual memory area set in a memory device selected from the plurality of memory devices connected to the networks based on the amount of image data of the third area and the communication speed and/or band of each of the networks.

12. A display apparatus, comprising:
a display memory for storing an image of a first area forming a portion of an entire image;
a display section including a display screen having a display area usable for displaying at least a partial image of the first area;
a case for exposing the display screen;
a scroll unit operable to move a display screen area appearing on the display screen over the entire image in accordance with a movement of the case;
a controller operable to provide a virtual memory for storing an image of a second area having a size greater than the size of the first area in the entire image when the scroll unit moves the display screen area beyond the first area; and
a table of management states of the virtual memory area in a respective memory device, in which the table of management states includes a listing representative of a plurality of virtual memory areas and an identification, a memory device name, an image file name, and an image file size for each of the virtual memory areas.

13. The display apparatus according to claim 12, further comprising a detection unit operable to detect the direction of movement of the case, wherein, based on a detected direction of movement, the controller identifies a partial area of the second area.

14. The display apparatus according to claim 12, further comprising a communication unit connectable to a plurality of networks, wherein the controller manages the second area by dividing the second area into a plurality of partial areas and sets the virtual memory to a memory device selected from a plurality of memory devices connected to the networks.

15. A display apparatus, comprising:
a display memory for storing an image of a first area forming a portion of an entire image;
a display section including a display screen having a display area usable for displaying at least a partial image of the first area;
a case for exposing the display screen;
scroll means for moving a display screen area appearing on the display screen over the entire image in accordance with a movement of the case; and
control means for controlling a virtual memory area for storing an image of a second area of the entire image when the scroll means moves the display screen area beyond the first area,
the control means being operable to divide the virtual memory area or the second area into a plurality of partial areas and to select a respective memory device from a plurality of memory devices for each of the partial areas based on an amount of image data of each of the partial areas and based on a storage capacity and/or access speed of each of the memory devices.

* * * * *